(12) United States Patent
Park et al.

(10) Patent No.: US 9,841,644 B2
(45) Date of Patent: Dec. 12, 2017

(54) ELECTROSTATIC DISCHARGE PROTECTION STRUCTURES FOR LIQUID CRYSTAL DISPLAYS

(71) Applicant: Apple Inc., Cupertino, CA (US)

(72) Inventors: Kwang Soon Park, Cupertino, CA (US); Byung Duk Yang, Cupertino, CA (US); Kyung-Wook Kim, Cupertino, CA (US); Shih-Chang Chang, Cupertino, CA (US); Yong Kwan Kim, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 353 days.

(21) Appl. No.: 14/497,204

(22) Filed: Sep. 25, 2014

(65) Prior Publication Data

US 2015/0323843 A1 Nov. 12, 2015

Related U.S. Application Data

(60) Provisional application No. 61/989,450, filed on May 6, 2014.

(51) Int. Cl.

| | |
|---|---|
| *F21V 7/04* | (2006.01) |
| *G02F 1/1343* | (2006.01) |
| *G02F 1/1335* | (2006.01) |
| *G02F 1/1333* | (2006.01) |
| *G02F 1/1362* | (2006.01) |

(52) U.S. Cl.
CPC .... *G02F 1/13439* (2013.01); *G02F 1/133308* (2013.01); *G02F 1/133514* (2013.01); *G02F 1/136204* (2013.01); *G02F 2001/133334* (2013.01)

(58) Field of Classification Search
CPC ............. G02F 1/136204; G02F 1/1368; G02F 1/133514; G02F 1/13439; G02F 1/133308
USPC ......................................................... 362/607
See application file for complete search history.

(56) References Cited

U.S. PATENT DOCUMENTS

| | | | |
|---|---|---|---|
| 7,342,579 B2 | 3/2008 | Chou et al. | |
| 7,362,124 B2 | 4/2008 | Kim et al. | |
| 2005/0017620 A1* | 1/2005 | Kim ..................... | H01J 11/44 |
| | | | 313/112 |
| 2006/0055295 A1* | 3/2006 | Shim ..................... | H01J 11/10 |
| | | | 313/112 |

(Continued)

*Primary Examiner* — Andrew Coughlin
*Assistant Examiner* — Meghan Ulanday
(74) *Attorney, Agent, or Firm* — Treyz Law Group, P.C.; Jason Tsai

(57) ABSTRACT

A liquid crystal display having an outer layer such as a thin-film transistor layer and an inner layer such as a color filter layer may be mounted in a metal device housing. Transparent conductive coating material may be formed on display layers. The transparent conductive coating material may include a layer on the upper surface of the thin-film transistor layer, a layer on the lower surface of the color filter layer, and an edge coating that extends between the upper surface layer and lower surface layer. Electrostatic discharge protection structures for the display may include a conductive elastomeric gasket that couples the upper surface layer to an inner surface of the housing, a conductive tape that couples the lower surface layer to the inner surface, and a conductive material on the inner surface that contacts the edge coating.

20 Claims, 10 Drawing Sheets

(56) References Cited

U.S. PATENT DOCUMENTS

| | | | |
|---|---|---|---|
| 2011/0285640 A1* | 11/2011 | Park | G02F 1/13338 345/173 |
| 2013/0329460 A1 | 12/2013 | Mathew et al. | |
| 2014/0071384 A1 | 3/2014 | Ho et al. | |
| 2014/0152943 A1 | 6/2014 | Dorjgotov et al. | |

* cited by examiner

ELECTROSTATIC DISCHARGE PROTECTION STRUCTURES FOR LIQUID CRYSTAL DISPLAYS

This application claims the benefit of provisional patent application No. 61/989,450, filed May 6, 2014, which is hereby incorporated by reference herein in its entirety.

BACKGROUND

This relates generally to electronic devices and, more particularly, to electronic devices with displays.

Electronic devices often include displays. For example, cellular telephones and portable computers include displays for presenting information to users.

Displays such as liquid crystal displays may be disrupted when exposed to electric charge. If care is not taken, a display may not operate properly following exposure to charge in an electrostatic discharge event.

It would therefore be desirable to be able to provide improved displays with electrostatic discharge protection structures.

SUMMARY

An electronic device may be provided with a display. The display may have electrostatic discharge protection structures. The electrostatic discharge protection structures can help prevent electrostatic charge that is deposited on the display during an electrostatic discharge event from disrupting proper operation of the display.

The electronic device may be provided with a housing. A display may be mounted in the housing. The housing may be formed from a conductive material such as metal and may serve as ground during electrostatic discharge events.

The display may be a liquid crystal display having an outer layer such as a thin-film transistor layer and an inner layer such as a color filter layer. Transparent conductive coating material may be formed on the layers of the display. The transparent conductive coating material may be indium tin oxide that is deposited in layers such as a layer on the upper surface of the thin-film transistor layer, a layer on the lower surface of the color filter layer, and an edge coating that extends between the upper surface layer and lower surface layer.

The electrostatic discharge protection structures may electrically couple the transparent conductive coating material to an inner surface of the housing. The electrostatic discharge protection structures may include a conductive elastomeric gasket that couples the upper surface layer to the inner surface, may include conductive tape that couples the lower surface layer to the inner surface, and may include conductive material on the inner surface that contacts the edge coating.

DETAILED DESCRIPTION

Illustrative electronic devices of the types that may be provided with displays are shown in FIGS. 1, 2, 3, and 4.

Figure 1:
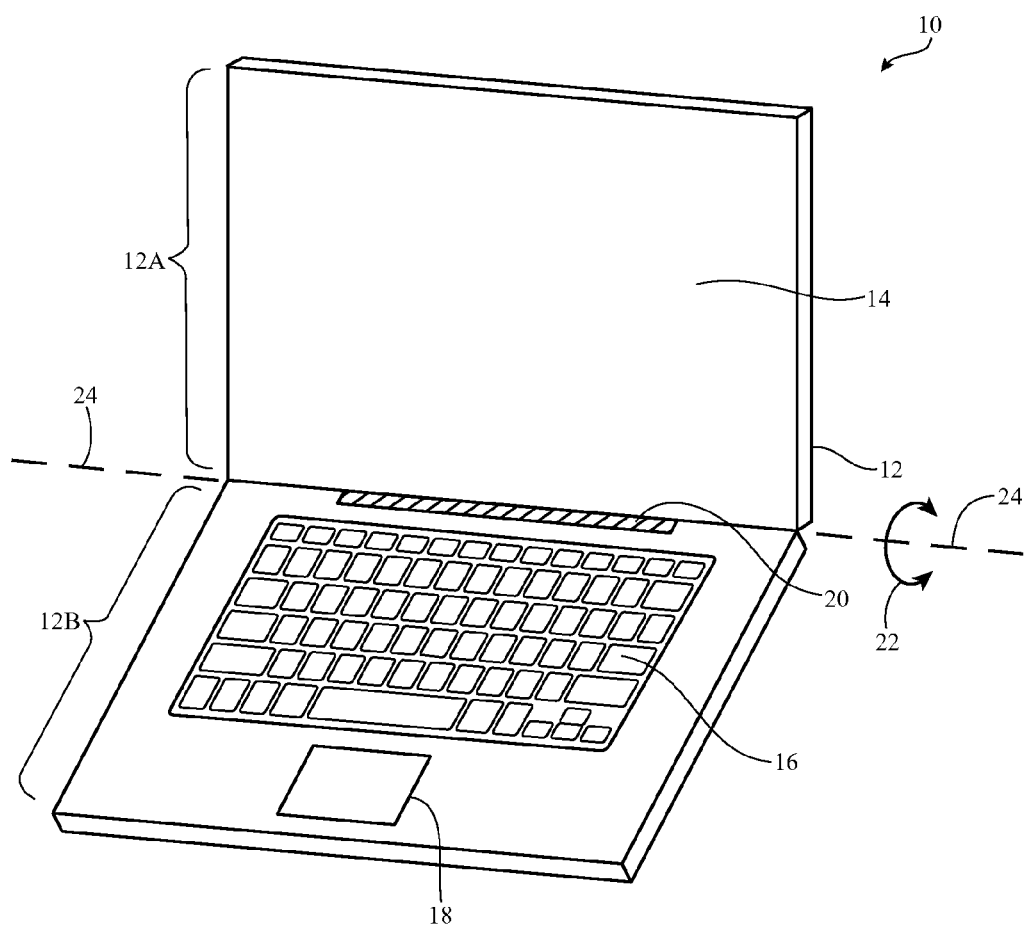
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
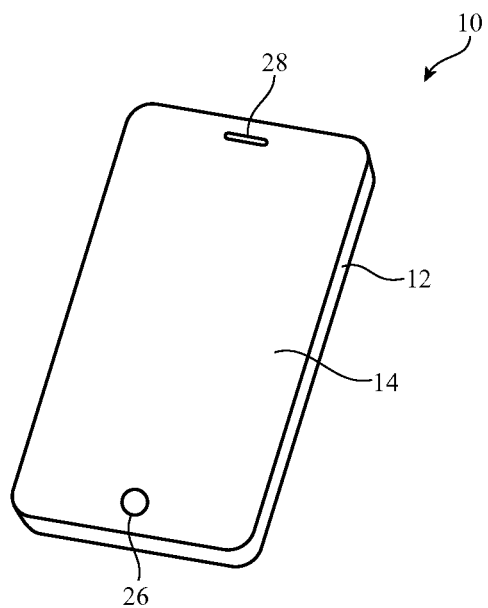
FIG. 2 is a perspective view of a portable electronic device such as a cellular telephone or other small portable device with a display in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
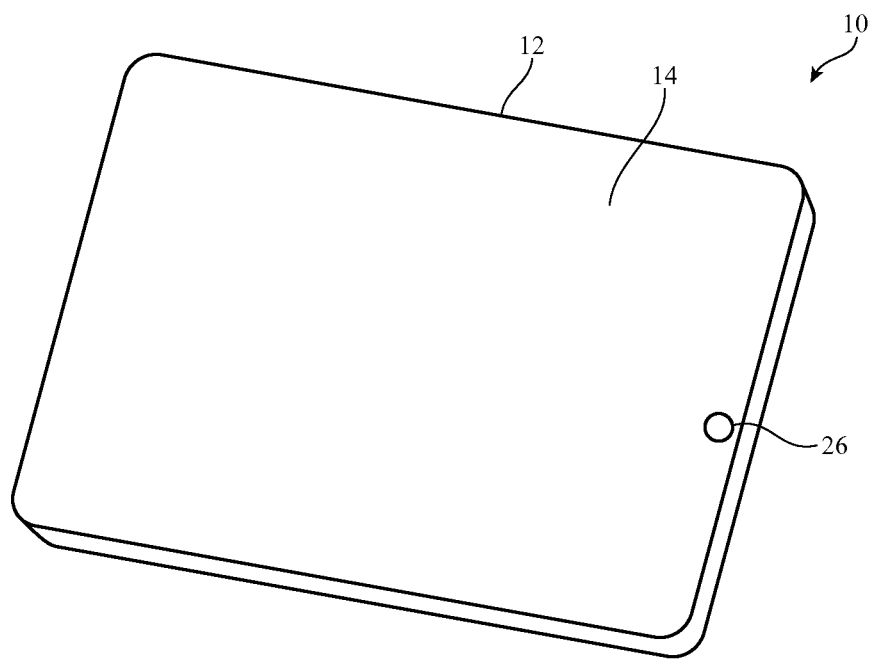
FIG. 3 is a perspective view of an illustrative tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
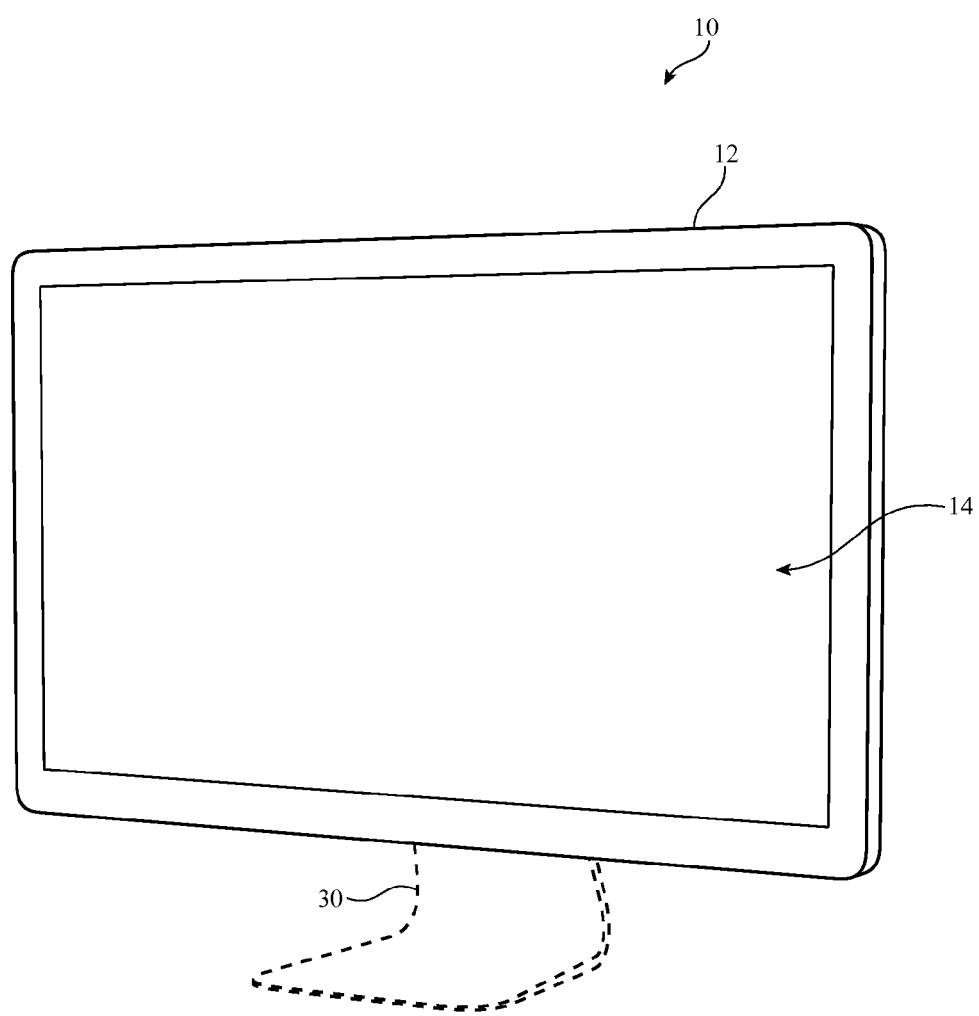
FIG. 4 is a perspective view of a display with an optional stand in accordance with an embodiment.

FIG. 4 shows an illustrative configuration for electronic device 10 in which device 10 is a computer display, a computer that has an integrated computer display, or other display device. Display 14 is mounted on a front face of housing 12. With this type of arrangement, housing 12 for device 10 may be mounted on a wall or may have an optional structure such as support stand 30 to support device 10 on a flat surface such as a table or desk.

Display 14 may be a liquid crystal display or a display formed using other suitable display technologies. Display 14 may be mounted in a watch, equipment in an embedded system, a gaming device, a navigation device, or any other electronic equipment. The examples of FIGS. 1, 2, 3, and 4 are merely illustrative.

Figure 5:
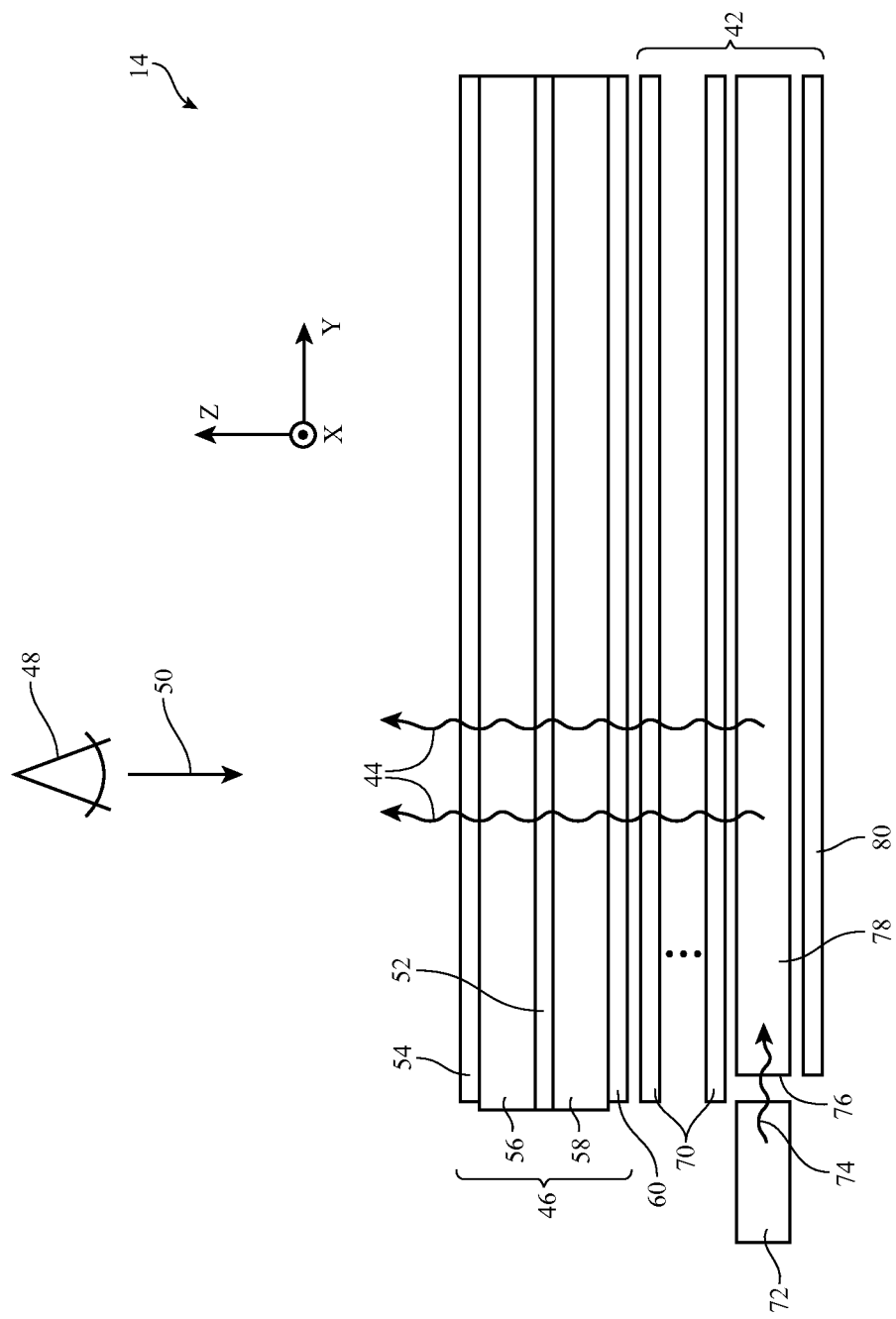
FIG. 5 is a cross-sectional side view of an illustrative display in accordance with an embodiment.

A cross-sectional side view of an illustrative configuration for display 14 of device 10 (e.g., a liquid crystal display for the devices of FIG. 1, FIG. 2. FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion of housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, outer substrate layer 56 may be a thin-film transistor layer that includes an array of thin-film transistors and associated electrodes (display pixel electrodes) for applying electric fields to liquid crystal layer 52 and thereby displaying images on display 14. Inner substrate layer 58 may be a color filter layer that includes an array of color filter elements for providing display 14 with the ability to display color images.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. If desired, some of these layers may be combined with other layers in display 14. For example, compensation films may be incorporated into polarizers 54 and/or 60. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Display 14 may have an array of display pixels (e.g., a rectangular array having rows and columns) for displaying images to a viewer. Vertical signal lines called data lines may be used to carry display data to respective columns of display pixels. Horizontal signal lines called gate lines may be used to carry gate line signals (sometimes referred to as gate control signals or gate signals) to respective rows of display pixels. The outline of the array of display pixels in display 14 defines an active area for display 14. The active area may have a rectangular shape and may be surrounded by an inactive border region. An inactive border area may, for example, run along one edge, two edges, three edges, or all four edges of the active area.

Figure 6:
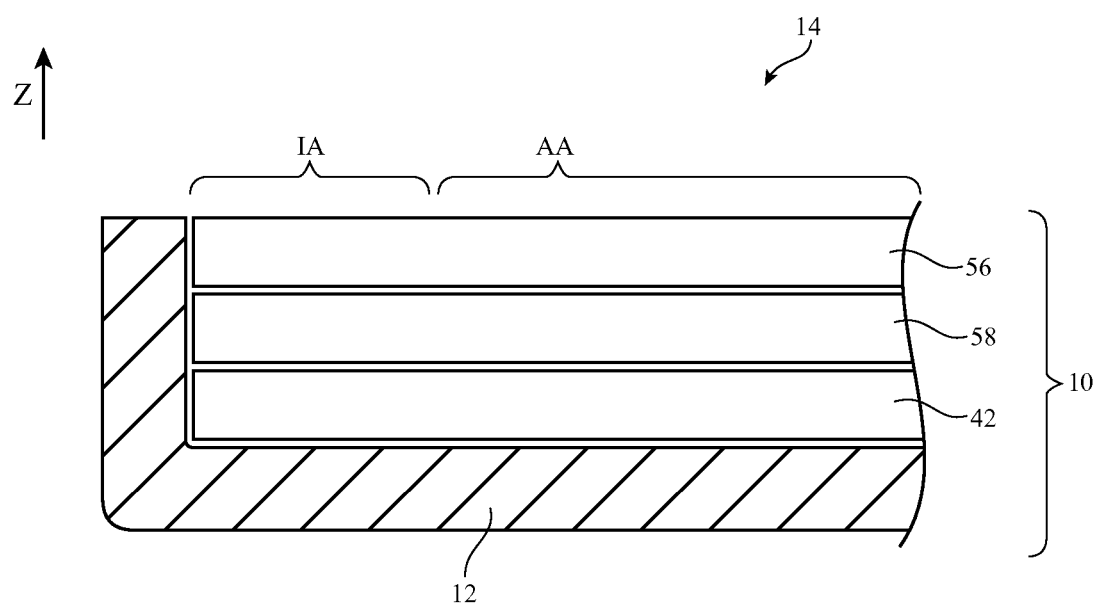
FIG. 6 is a cross-sectional side view of an edge portion of a display showing how the display may have inactive and active areas in accordance with an embodiment.

A cross-sectional side view of an illustrative electronic device having a display such as display 14 of FIG. 5 is shown in FIG. 6. As shown in FIG. 6, images may be displayed on central active area AA of display 14. Inactive area IA may have a rectangular ring shape that runs around the rectangular periphery of active area AA. To avoid unsightly bezel structures in device 10, it may be desirable to keep inactive area IA free of overlapping housing structures, bezels, or other potentially unattractive border structures.

Figure 7:
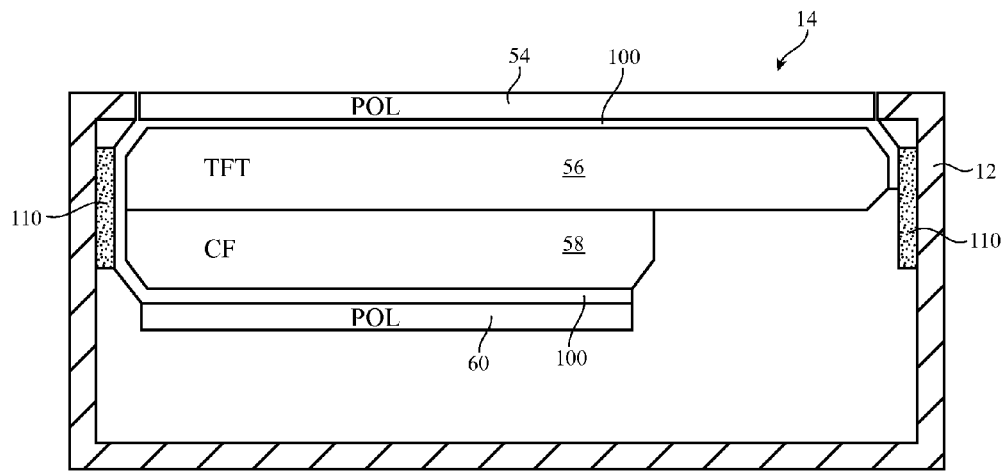
FIG. 7 is a cross-sectional side view of an illustrative display having a thin-film transistor layer on top of a color filter layer in accordance with an embodiment.

In one suitable embodiment, a transparent conductive layer such as a layer of indium tin oxide (ITO) 100 may be formed on the thin-film transistor (TFT) layer 56 and/or on color filter (CF) layer 58 to assist in discharging electrostatic charge to ground (see, e.g., FIG. 7). As shown in FIG. 7, conductive material such as conductive material 110 may be formed along the inner surfaces of side walls of housing 12 to electrically couple ITO layer 100 to housing 12. Material 110 may be formed from conductive adhesive, metal, ITO, conductive tape, conductive elastomeric material (e.g., conductive rubber), metallic paint, or a coating of other conductive material. ITO layer 100 may have a first portion on the upper surface of layer 56, a second conformal portion along the edges of layers 56 and 58 that runs perpendicular to the first portion, and a third portion on the lower surface of layer 58. All of these portions of the ITO layer are physically and electrically connected to each other to form a conductive path that is shorted to material 110 and thereby grounded to housing 12. This allows layers 100 and material 110 to form electrostatic discharge structures. Configured in this way, electrostatic charge that that has the potential to accumulate in layers 56 and 58 may be effectively discharged through layer 100 and material 110 to housing 12, which serves as a ground discharge path. This is merely illustrative. In some embodiments, conductive layer 100 need not be formed on CF layer 58.

Figure 8:
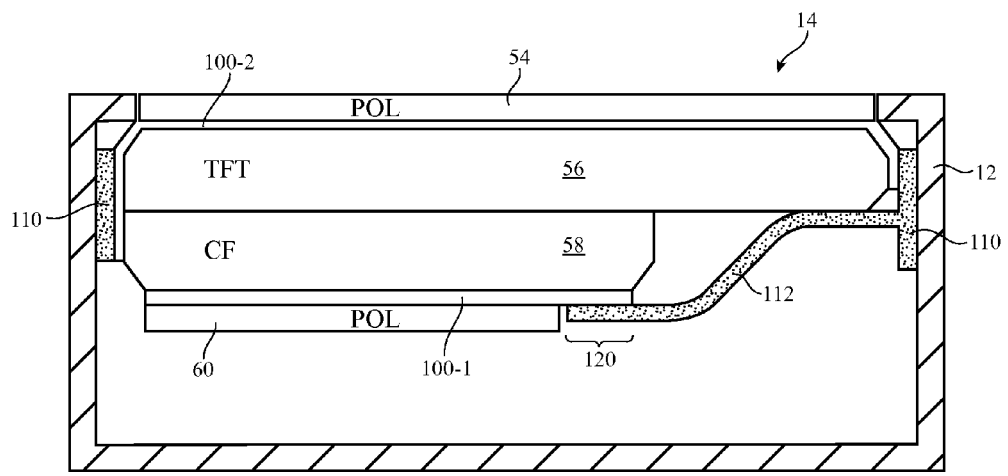
FIG. 8 is a cross-sectional side view of an illustrative display with an electrostatic discharge protection structure formed from conductive tape in accordance with an embodiment.

In another suitable arrangement (see, FIG. 8), a first conductive layer such as layer 100-1 (e.g., a first ITO layer) may be formed on CF layer 58, whereas a second conductive layer such as layer 100-2 (e.g., a second ITO layer that is separate from the first ITO layer) may be formed on TFT layer 56. As shown in FIG. 8, sidewall conductive material 110 may serve to couple ITO layer 100-2 to housing 12. An additional conductive path in the form of a conductive tape 112 (e.g., a conductive black tape) may serve to electrically couple ITO layer 100-1 to housing 12. For example, tape 112 may have a first end that is attached to an exposed portion 120 on ITO layer 100-1 and a second end that is attached to housing 12. Tape 112 may include one or more layers of material such as metal foil layers, metal coatings, adhesive layers, conductive adhesive layers, polymer layers that serve as carrier layers, etc. Black tape may be used for tape 112 to help block stray light.

Figure 9A:
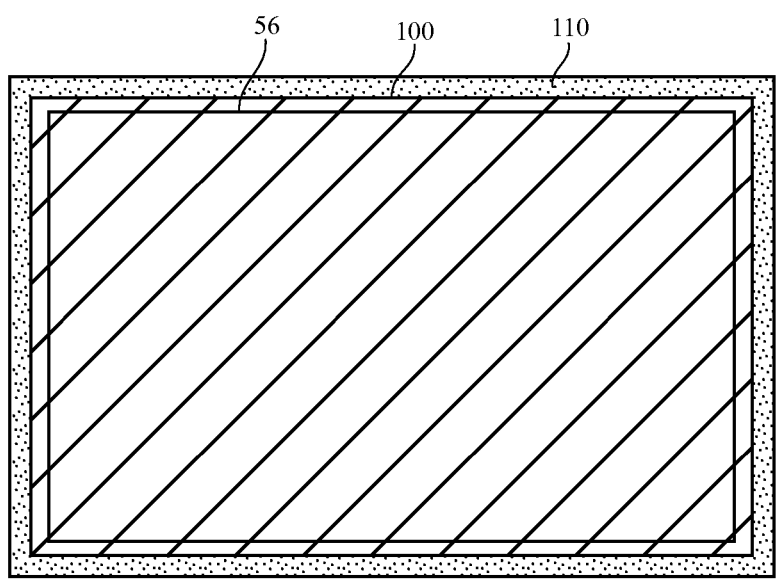
FIG. 9A is a top view of an illustrative display in accordance with an embodiment.

FIG. 9A shows a top view of display 14. As shown in FIG. 9A, an ITO layer 100 may be formed over and along the sides of TFT layer 56. Conductive sidewall material 110 may be formed along all four edges of TFT layer 56. This is merely illustrative. Conductive sidewall material 110 may be formed along one or more edges of layer 56, two or more edges of layer 56, three or more edges of layer 56, etc.

Figure 9B:
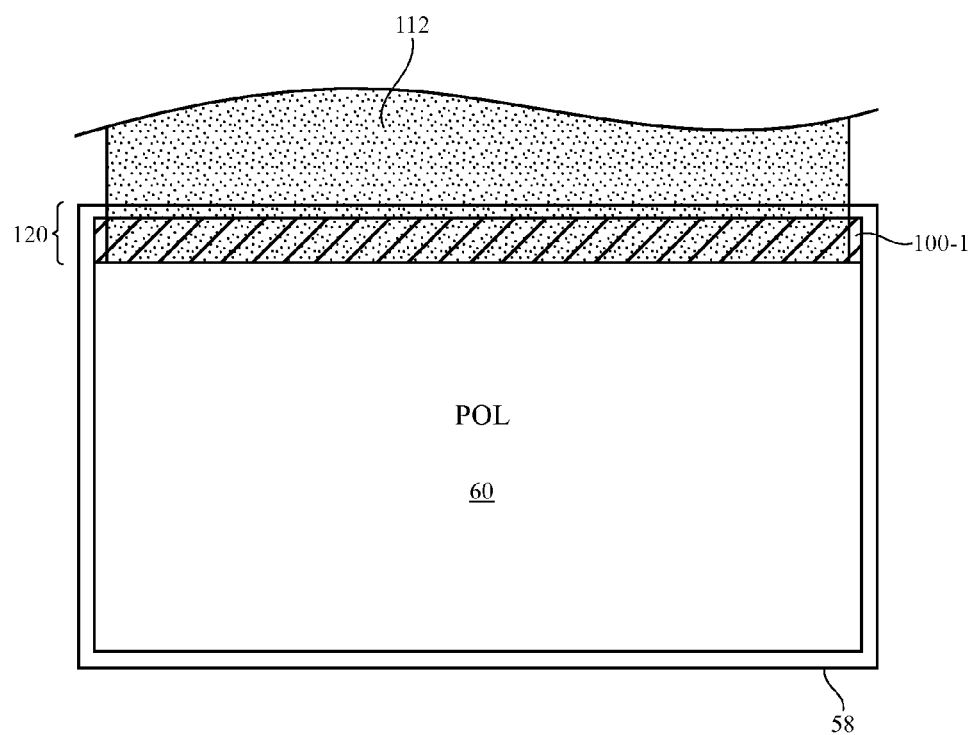
FIG. 9B is a bottom view of an illustrative display showing how conductive tape may be attached along an edge of a display layer to assist with electrostatic discharge protection in accordance with an embodiment.

FIG. 9B shows an exemplary bottom view of display 14 of the type shown in FIG. 8. As shown in FIG. 9B, ITO layer 100-2 may be formed on CF layer 58. Color filter polarizer layer 60 may be formed on layer 100-2. Polarizer layer 60 (which may be formed from insulating materials such as polymers) may only cover a portion of layer 100-2 while leaving an exposed portion 120. Conductive tape 112 (e.g., an opaque adhesive member) may be coupled to the exposed portion 120 to effectively provide an electrostatic discharge path for the color filter structures.

Figure 10:
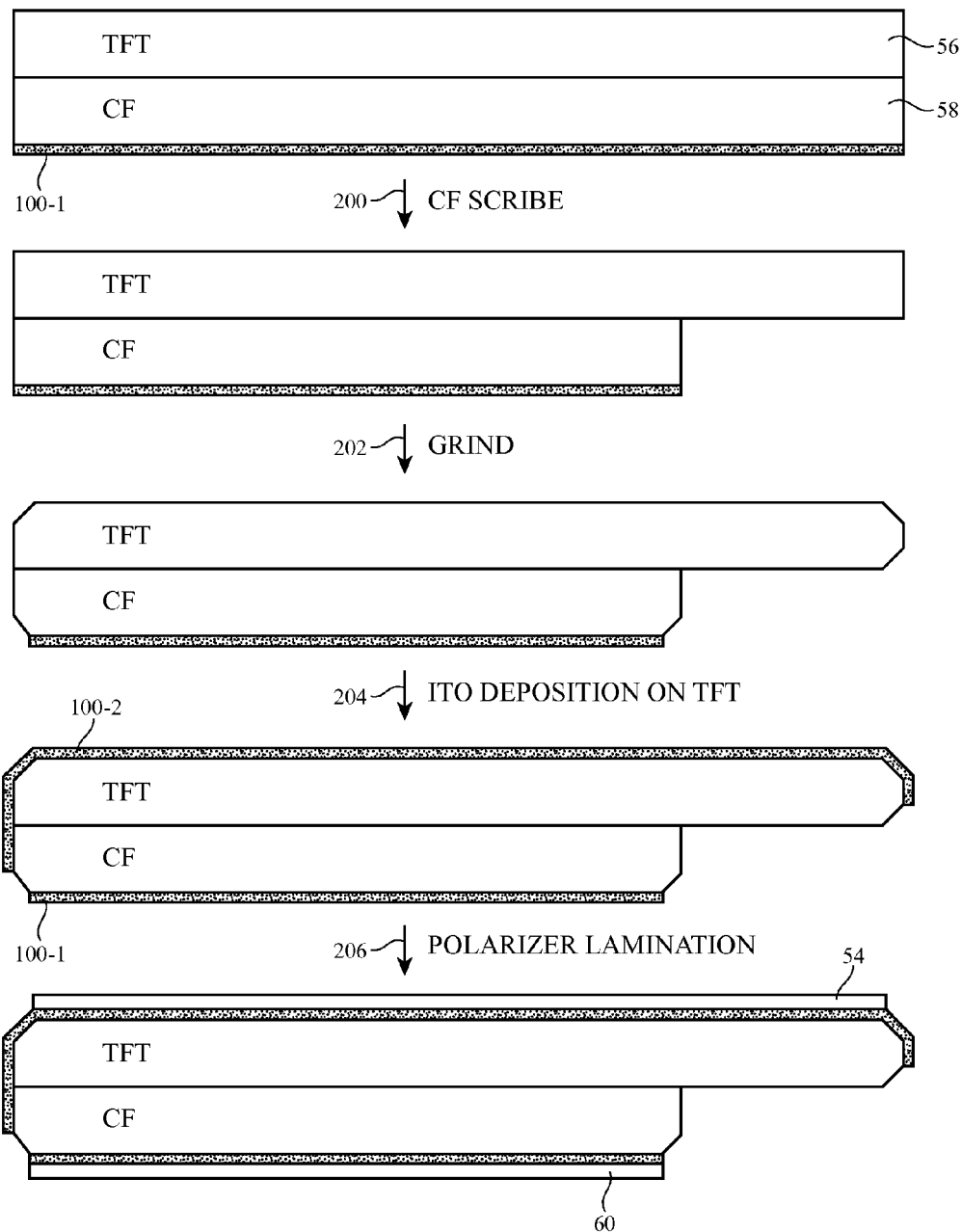
FIG. 10 is a diagram showing illustrative operations involved in forming a display in accordance with an embodiment.
Figure 11:
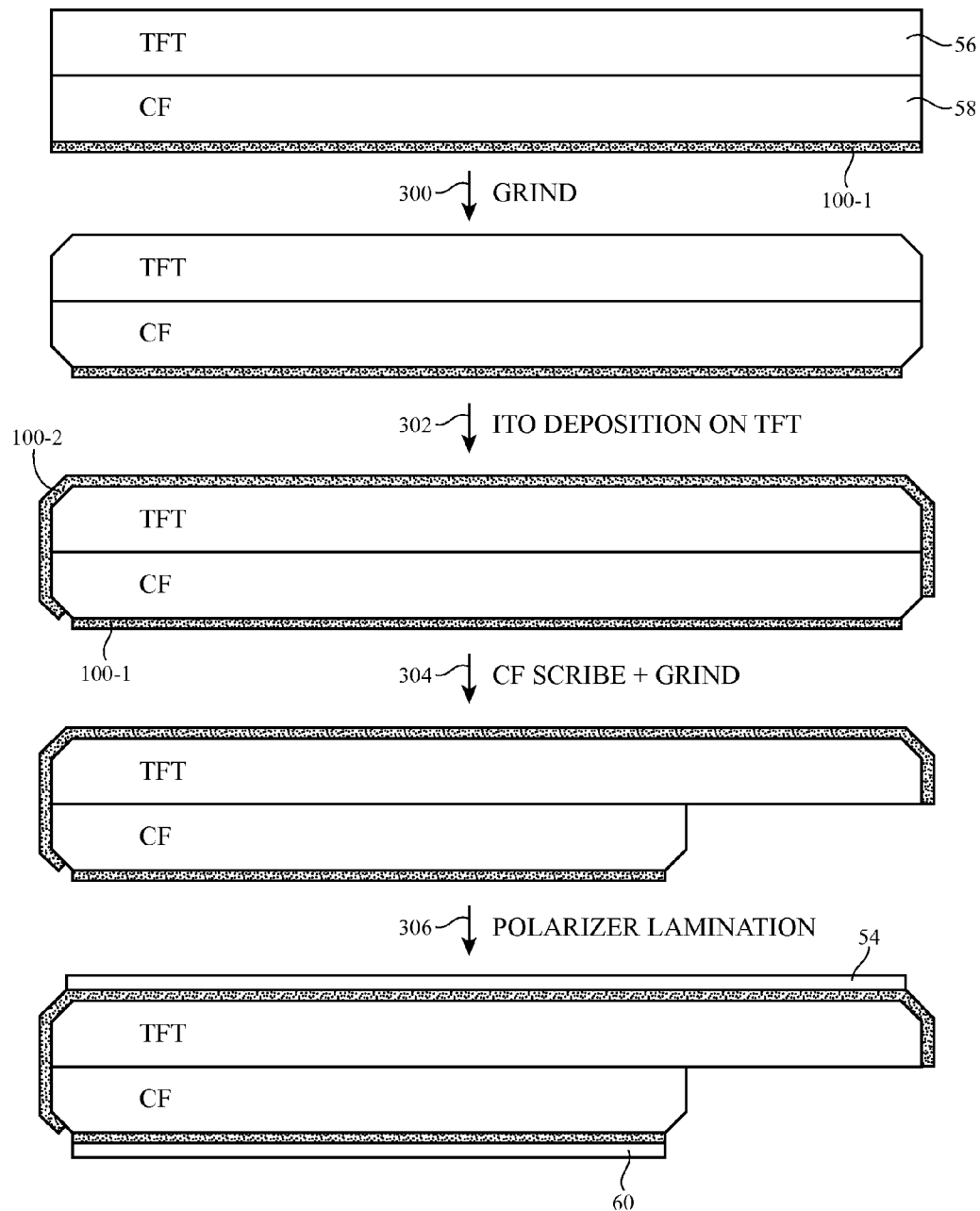
FIG. 11 is a diagram of other illustrative operations involved in forming a display in accordance with an embodiment.

FIGS. 10 and 11 are flow charts of illustrative steps for manufacturing display 14 of the type described in connection with FIGS. 1-9.

In the arrangement of FIG. 10, layers 56 and 58 may be bonded together and optional ITO layer 110-1 may be formed on the lower surface of color filter layer 58. As shown by line 200, color filter layer 58 may then be scribed (if desired) and an edge portion of layer 58 may be removed to form a TFT ledge (e.g., a ledge that receives subsequent electrical connections for display driver circuitry). After the ledge has been formed, grinding operations may be performed on the bonded layers (e.g., to smooth and bevel the edges of the layers), as shown by line 202. As shown by line 204, upper and side layer portions of ITO (i.e., ITO coating 100-2) may be then be deposited. ITO layers 100-2 and 100-1 may be electrically separate or may be shorted to each other. Following formation of layers 100-2 and 100-1, polarizers 54 and 60 may be attached to the upper and lower surfaces of TFT layer 56 and CF layer 58 (e.g., using adhesive), as shown by line 206.

In the arrangement of FIG. 11, scribing/grinding operations may be performed after ITO deposition. Initially, layers 56 and 58 may be bonded together and optional ITO layer 110-1 may be formed on the lower surface of color filter layer 58. As shown by line 300, grinding operations may then be performed to smooth and bevel the edges of the layers. As shown by line 302, upper and side layer portions of ITO (i.e., ITO coating 100-2) may be then be deposited. ITO layers 100-2 and 100-1 may be electrically separate or may be electrically coupled (i.e., layers 100-1 and 100-2 may contact each other to form an electrical connection between layers 100-1 and 100-2). Following deposition of coating 100-2, scribing and grinding operations may be performed to form a TFT layer ledge, as shown by line 304. Following formation of layers 100-2 and 100-1, polarizers 54 and 60 may be attached to the upper and lower surfaces of TFT layer 56 and CF layer 58 (e.g., using adhesive), as shown by line 306.

After forming the display layers for display 14 using techniques of the types shown in FIGS. 10 and 11 or other suitable techniques, the display layers may be installed within housing 12 so that material 110 shorts layers 110-1 and/or 110-2 to housing 12. Housing 12 may be formed from a conductive material such as metal and can serve as ground for electrostatic discharge.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a metal housing that serves as ground; and
a display mounted in the housing that comprises:
    a backlight unit;
    a thin-film transistor layer;
    a color filter layer that is interposed between the thin-film transistor layer and the backlight unit, wherein the color filter layer has first and second opposing surfaces, and wherein the second surface of the color filter layer faces the thin-film transistor layer; and
    at least one transparent conductive structure that covers an edge of at least one layer in the display, wherein the at least one display layer has a top surface and a bottom surface, wherein the edge is between the top surface and the bottom surface, and wherein the at least one transparent conductive structure comprises a transparent conductive layer on the first surface of the color filter layer; and
electrostatic discharge protection structures that couple the at least one transparent conductive structure to the metal housing.

2. The electronic device defined in claim 1 wherein the electrostatic discharge protection structures include conductive tape.

3. The electronic device defined in claim 2 wherein the electrostatic discharge protection structures include conductive elastomeric material.

4. The electronic device defined in claim 3 wherein the metal housing has an inner surface and wherein the conductive elastomeric material contacts the inner surface.

5. The electronic device defined in claim 4 wherein the conductive tape contacts the inner surface.

6. The electronic device defined in claim 5 wherein the thin-film transistor layer has first and second surfaces, wherein the second surface of the thin-film transistor layer faces the second surface of the color filter layer, and wherein the transparent conductive layer is also formed on the first surface of the thin-film transistor layer.

7. The electronic device defined in claim 6 wherein the conductive tape contacts the second transparent conductive layer.

8. The electronic device defined in claim 7 wherein the conductive elastomeric material contacts the first transparent conductive layer.

9. The electronic device defined in claim 1 wherein the metal housing has an inner surface and wherein the electrostatic discharge protection structures comprise conductive material on the inner surface.

10. The electronic device defined in claim 9 wherein the thin-film transistor layer has first and second surfaces, wherein the second surface of the thin-film transistor layer faces the second surface of the color filter layer, and wherein the at least one transparent conductive structure further comprises an additional transparent conductive layer on the first surface of the thin-film transistor layer.

11. The electronic device defined in claim 10 wherein the at least one transparent conductive structure comprises a portion that extends along edge portions of the thin-film transistor layer and the color filter layer between the transparent conductive layer and the additional transparent conductive layer and wherein the portion contacts the conductive material on the inner surface.

12. The electronic device defined in claim 11 wherein the electrostatic discharge protection structures include conductive tape.

13. The electronic device defined in claim 12 wherein the conductive tape contacts the inner surface.

14. The electronic device defined in claim 13 wherein the conductive tape comprises black tape.

15. The electronic device defined in claim 1 wherein the at least one transparent conductive structure comprises an indium tin oxide coating.

16. An electronic device, comprising:
a metal housing that serves as ground and that has an inner surface; and
a display comprising:
 a backlight unit;
 a thin-film transistor layer that has first and second opposing surfaces;
 a color filter layer that is interposed between the thin-film transistor layer and the backlight unit, wherein the color filter layer has first and second opposing surfaces, and wherein the second surface of the thin-film transistor layer faces the second surface of the color filter layer; and
 at least one transparent conductive structure that contacts the thin-film transistor layer and the color filter layer, wherein the at least one transparent conductive structure comprises a first transparent conductive layer on the first surface of the thin-film transistor layer and a second transparent conductive layer on the first surface of the color filter layer; and
electrostatic discharge protection structures that couple the at least one transparent conductive structure to the metal housing, wherein the electrostatic discharge protection structures include a conductive material on the inner surface.

17. The electronic device defined in claim 16 wherein the at least one transparent conductive structure comprises a portion that extends along edge portions of the thin-film transistor layer and the color filter layer between the first transparent conductive layer and the second transparent conductive layer and wherein the portion contacts the conductive material on the inner surface.

18. The electronic device defined in claim 17 wherein the electrostatic discharge protection structures include conductive tape that extends between the second transparent conductive layer and the inner surface.

19. An electronic device, comprising:
a metal housing that serves as ground and that has an inner surface; and
a display comprising:
 a backlight unit;
 a thin-film transistor layer;
 a color filter layer that is interposed between the thin-film transistor layer and the backlight unit; and
 at least one transparent conductive structure on at least one layer in the display; and
electrostatic discharge protection structures that couple the at least one transparent conductive structure to the metal housing, wherein the electrostatic discharge protection structures include a conductive material on the inner surface, wherein the thin-film transistor layer has first and second surfaces, wherein the color filter layer has first and second surfaces, wherein the second surface of the thin-film transistor layer faces the second surface of the color filter layer, wherein the at least one layer transparent conductive structure comprises a first transparent conductive layer on the first surface of the thin-film transistor layer and a second transparent conductive layer on the first surface of the color filter layer, and wherein the electrostatic discharge protection structures include conductive tape that extends between the second transparent conductive layer and the inner surface.

20. The electronic device defined in claim 19 wherein the at least one transparent conductive structure comprises a portion that extends along edge portions of the thin-film transistor layer and the color filter layer between the first transparent conductive layer and the second transparent conductive layer, wherein the portion contacts the conductive material on the inner surface, and wherein the portion and the first and second transparent conductive layers comprise indium tin oxide.

* * * * *